Dec. 29, 1959    M. R. GUIOT    2,918,913
IGNITION SYSTEMS OF INTERNAL COMBUSTION ENGINES
Filed June 12, 1957    6 Sheets-Sheet 1

Inventor
MAURICE ROBERT GUIOT

Dec. 29, 1959 M. R. GUIOT 2,918,913
IGNITION SYSTEMS OF INTERNAL COMBUSTION ENGINES
Filed June 12, 1957 6 Sheets-Sheet 2

Inventor
MAURICE ROBERT GUIOT

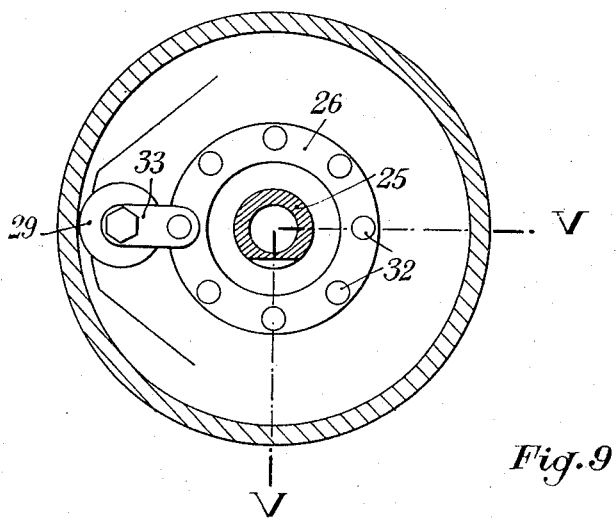
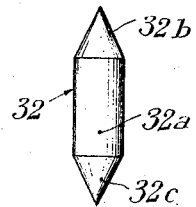
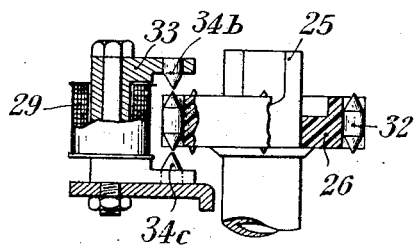

Dec. 29, 1959  M. R. GUIOT  2,918,913
IGNITION SYSTEMS OF INTERNAL COMBUSTION ENGINES
Filed June 12, 1957  6 Sheets-Sheet 4

Inventor
MAURICE ROBERT GUIOT

Dec. 29, 1959     M. R. GUIOT     2,918,913
IGNITION SYSTEMS OF INTERNAL COMBUSTION ENGINES
Filed June 12, 1957     6 Sheets-Sheet 5

Inventor
MAURICE ROBERT GUIOT

Dec. 29, 1959   M. R. GUIOT   2,918,913
IGNITION SYSTEMS OF INTERNAL COMBUSTION ENGINES
Filed June 12, 1957   6 Sheets-Sheet 6

INVENTOR
MAURICE ROBERT GUIOT
BY
ATTORNEY

United States Patent Office 2,918,913
Patented Dec. 29, 1959

2,918,913

IGNITION SYSTEMS OF INTERNAL COMBUSTION ENGINES

Maurice Robert Guiot, Paris, France, assignor to Weselco Limited, Toronto, Canada, a corporation of Canada Application June 12, 1957, Serial No. 665,311

7 Claims. (Cl. 123—119)

The present invention relates to ignition systems of internal combustion engines.

Up to now the conventional electromechanical ignition system comprises an induction or Ruhmkorff coil and a contact-breaker and distributor assembly having the twofold function of periodically breaking (and making) the primary circuit by means of metal points, generally tungsten points, and distributing the high-tension pulses resulting from this circuit opening to the ignition sparking plugs in the proper firing order.

The breaking of the primary current by the periodical movement of the contact-breaker points away from each other is characterized by certain inconveniences increasing with the engine speed. The movable point is urged back for engagement with the fixed point by a spring of which the tension must be sufficient to reduce the electrical contact resistance of the two points to a minimum. At high engine speeds (for example of the order of 5,000 r.p.m.'s) the vibration frequency of the spring occasionates detrimental phenomena such as the rebound of the movable point resulting in a faulty supply of current to the coil.

Besides the induction coil comprises a considerable magnetic core which is necessary to produce a high self-induction at low engine speeds in view of permitting a satisfactory starting of the engine. On the other hand, at high engine speeds the substantial magnetic losses resulting therefrom involve a drop in the high tension produced by the system.

In short, the above-listed inconveniences are the cause of a poor or at least objectionable efficiency at high speeds, considering the present trend towards higher engine speeds.

Now it is the essential object of this invention to provide a novel ignition system whereby these inconveniences are avoided by dispensing with the limitations of the mechanical contact breaker and ignition coil.

This invention relates to an electronic ignition device for an internal combustion engine comprising essentially a transistor-operated oscillator tuned at a given frequency and having its oscillating coils coupled directly or through a magnetic circuit to the high-tension coil; the connection between these coils being interrupted periodically by a suitable rotary breaker; this breaker may be secured on the shaft driving the distributor in the known coil ignition systems utilizing a contact-breaker and distributor unit.

To this end, the ignition system for an internal combustion engine according to the present invention comprises a transistor unit, means for coupling an output circuit to an input circuit of said transistor in such a manner that the aforesaid unit is adapted to generate high frequency oscillations, another coupling means for feeding said oscillations to a sparking plug, and a mechanically driven member adapted to modify said coupling means which is driven in synchronism with the engine motion for controlling the delivery of said oscillations to the sparking plug.

The frequency at which the oscillator operates must be sufficient to permit the occurrence of several oscillations across the plug electrodes during the ignition time interval. If this frequency were too low (for example 10 kc./s.) a single oscillation would occur at high engine speed during the ignition period and as a result appreciable variations in the tension level would take place at the beginning of the ignition. By selecting a frequency value of more than 30 kc./s. the number of oscillations produced during the ignition period is sufficient for obtaining a satisfactory tension level.

The device according to this invention is advantageous in that the high tension obtained thereby is independent of the engine speed, whereas all the conventional coil-ignition systems are characterized by a substantial high-tension drop as the engine speed increases, due to the considerable magnetic losses in the core of the induction coil.

Moreover, the duration of the ignition time may be adjusted with a high degree of flexibility by simply discontinuing for a more or less extended period the coil coupling.

The ignition timing may be adjusted at will as a function of the ignition frequency by interposing a suitable phase-displacing network in the high-tension circuit. The phase displacement of the high-tension pulses is subordinate to the frequency of the coupling breaks and also to the nature of the component elements of the aforesaid network.

On the other hand, the ignition device may be utilized for other control purposes. Thus, this device may also generate, in synchronism with the ignition pulses, other pulses that may be used in turn for energizing for example a direct-injection fuel feed system. This direct-injection system may be of mechanical, electrical or electronic character. By inserting a dephasing network in the circuit carrying these pulses, it becomes possible to introduce a suitable phase shifting determined with all the desired accuracy for each engine speed between the fuel injection and the ignition. Consequently, an optimum combustion will be obtained under these conditions.

In order to afford a better understanding of the present invention and of the manner in which the same may be carried out in the practice, reference will now be made to the accompanying drawing illustrating diagrammatically by way of example a few typical embodiments of the invention. In the drawing:

Figure 7 is an elevational view showing on a larger scale a soft-iron member utilized in the embodiment of Figs. 6 and 6a.

Figure 8 is a plane view illustrating another embodiment of a rotary breaker suitable for use in the mounting of Fig. 5.

Figure 8a is a longitudinal section taken upon the line V—V of Fig. 8.

Figure 9 is an elevational view showing on a larger scale a soft-iron member adapted for use in the embodiment of Figs. 8 and 8a.

Figure 1:
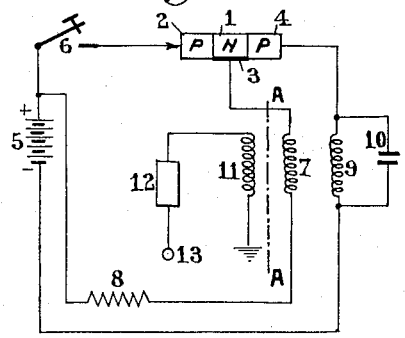
Figure 1 is a wiring diagram illustrating a first embodiment of the invention.

Referring first to Fig. 1 of the drawing, this diagram illustrates an oscillator assembly. The emitter 2 of a PNP-type junction transistor 1 is connected through a switch 6 to the positive terminal of a battery 5, in this case the storage battery of a vehicle. The switch 6 is closed when the ignition key of the vehicle is turned on. The transistor emitter 6 is thus fed with a 6-volt or 12-volt voltage, according to the battery voltage. The base electrode 3 is connected to one terminal of a coil 7 having its other end connected through a resistor 8 to the positive terminal of the battery 5. Similarly, the collector 4 is connected to one end of a resonant circuit consisting of a coil 9 and condenser 10, the other end of this circuit being connected to the negative terminal of the battery 5. Both coils 7 and 9, in this specific embodiment, are coupled directly with each other and also to a third booster coil 11. One terminal of this coil 11 is earthed and the other terminal is connected to an H—T output terminal 13 through the medium of a phase-displacing circuit 12 of known type.

Of course, in this mounting an NPN transistor may be substituted for the PNP transistor illustrated, provided that the polarities of the different electrodes are inverted accordingly.

When the oscillator operates, i.e. when the switch 6 is closed, at a predetermined frequency, for example 100 kc./s., a train of high-tension oscillations are generated continuously in the booster coil 11. By periodically discontinuing the coupling between the coils 7 and 9 on the one hand and the aforesaid coil 11 on the other hand, as shown diagrammatically by the chain-dotted line A—A, this train is divided into a series of pulses consisting themselves of high tension oscillations. These pulses circulate through the phase-displacing network 12 and are subsequently delivered therefrom and available at the terminal 13 for delivery to the sparking plugs.

Figure 2:
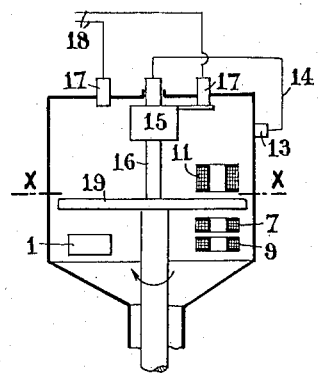
Figure 2 is a longitudinal diagrammatic section showing a device according to the diagram of Fig. 1.
Figure 2A:
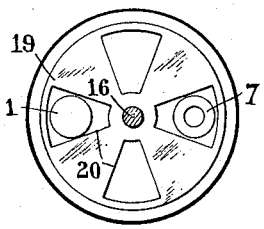
Figure 2a is a diagrammatic cross-section taken upon the line X—X of Fig. 2.

A practical embodiment of a device according to the arrangement shown diagrammatically in Fig. 1 is illustrated in Figs. 2 and 2a. In this typical embodiment the ignition system of a four-stroke, four-cylindered engine is contemplated. In the body of a conventional-type contact-breaker and distributor assembly there are mounted a transistor 1, oscillating coils 7, 9 and a high tension coil 11. The H—T output terminal 13 may be connected through an external (or internal) wire 14 to the distributor mounted on the shaft 16 rotating at half engine speed in the case of the four-stroke, four-cylindered engine. This distributor delivers the current in the conventional manner to the studs 17 from which the high tension leads 18 feed the sparking plugs (not shown). Solid with the shaft 16 is a metal disc 19 in which four segment-shaped apertures 20 are formed somewhat in the fashion of a Geneva wheel. When one of these apertures 20 is in alignment with or disposed between the coils 9 and 11, the coil 11 is coupled to the oscillating coils and becomes the seat of high tension oscillations. On the other hand, when a solid portion of the disc 19 is interposed between these coils, the coupling is suppressed and no oscillation circulates through the coil 11. Thus, when the disc 19 rotates at half engine speed the coil 11 generates high tension pulses of which the frequency corresponds to the frequency of the coupling breakages.

From the foregoing it is apparent that the high tension thus obtained is independent of the engine speed and consequently for a given r.p.m. value it is a simple matter to obtain a pulse of the desired duration, since this duration is a function of the magnitude of the aperture 20.

Figure 3:
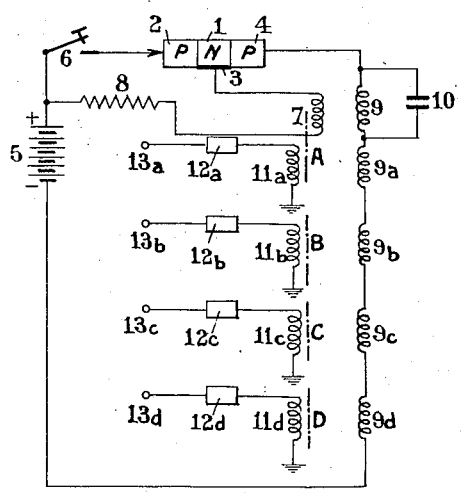
Figure 3 illustrates the wiring diagram of another embodiment of the invention.
Figure 4:
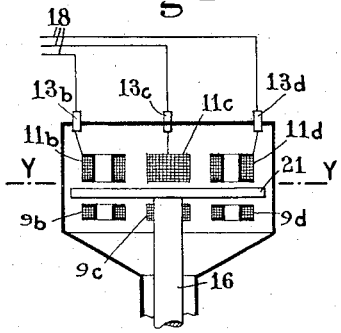
Figure 4 is a longitudinal diagrammatic section of a device according to the diagram of Fig. 3.
Figure 4A:
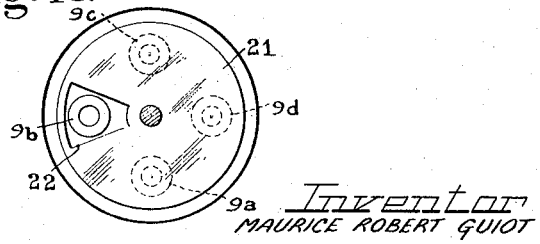
Figure 4a is a diagrammatic cross-section taken upon the line Y—Y of Fig. 4.

Fig. 3 of the drawing shows the wiring diagram of a modified embodiment of the device of this invention of which Figs. 4 and 4a illustrate the preferred construction. In this example a separate ignition circuit is provided for each cylinder. Thus, the inconveniences arising from the frictional engagement between the distributor rotor or arm 15 and the brass segments 17 are avoided. In this diagram the members already illustrated in Fig. 1 are designated by the same reference numerals. Four coupling coils 9a, 9b, 9c and 9d are coupled in series with the oscillating coil 9 and condenser 10. The coupling coils 9a, 9b, 9c and 9d are coupled to booster coils 11a, 11b, 11c and 11d respectively. Each booster coil is connected to the terminals 13a, 13b, 13c, 13d, respectively, through phase-displacing networks 12a, 12b, 12c, 12d respectively. The chain-dotted lines A, B, C, D designates as in the preceding embodiment the coupling interruptions between these coils. Referring now to Figs. 4 and 4a, it will be seen that the coils 9a, 9b, 9c and 9d on the one hand and coils 11a, 11b, 11c and 11d on the other hand are disposed on either sides of a metal disc 21 secured on the shaft 16. This disc 21 has only one aperture 22 formed therein. When the shaft 16 and, consequently, the metal disc 21 are rotated at half engine speed (in the case of a four-stroke, four-cylindered engine), the aperture 22 passes successively between the pairs of coils 9a—11a, 9b—11b, 9c—11c and 9d—11d spaced 90° apart. Thus when the engine has accomplished two revolutions, i.e., when the shaft 16 and disc 21 have performed one revolution, the four pairs of coils have been coupled in succession. Each coil 11 has thus become the seat of a train of high-tension oscillations of which the duration is subordinate to the velocity of rotation of the shaft 16 and to the area of the aperture 22. Thus, at the terminals 13a, 13b, 13c and 13d high-tension pulses are available which are produced with a relative spacing of 90° with reference to the rotation of the shaft 16, and 180° with reference to the rotation of the engine. Thus, it will be sufficient to connect these terminals 13a, 13b, 13c and 13d through high-tension leads to the corresponding sparking plugs in the proper order. A phase-displacing network 12a, 12b, 12c and 12d incorporating booster coils is provided in order to shift the high tension pulses as a function of the break frequency, i.e. of the engine speed.

Figure 5:
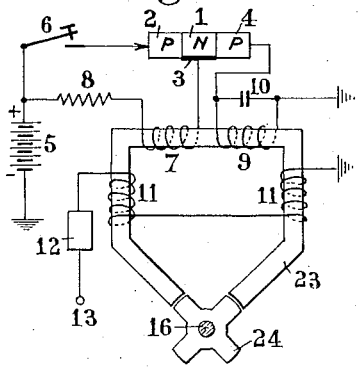
Figure 5 illustrates another modification of a device constructed according to the teachings of the diagram of Fig. 1.

Fig. 5 illustrates a construction made in accordance with the arrangement of Fig. 1. In this modified structure—constituting the preferred embodiment for lower oscillation frequencies—the elements of Fig. 1 are also incorporated and designated by the same reference numerals. The coils 7 and 9 are coupled with each other and also with the booster coil 11 through a magnetic circuit 23. This circuit 23 is illustrated as being closed by a four-armed core 24. This core 24 is secured on the shaft 16. When this shaft rotates, the rotation of the core 24 causes the magnetic circuit 23 to be periodically opened and closed. As a result, the coil 11 is subjected to a succession of high tension pulses at a frequency depending on the velocity of rotation of the shaft 16.

Figure 6:
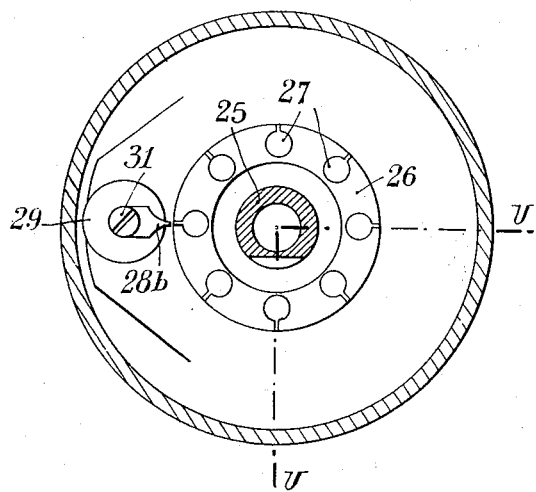
Figure 6 is a plane view showing a first embodiment of a rotary breaker suitable for use in the arrangement shown in Fig. 5.
Figure 7:
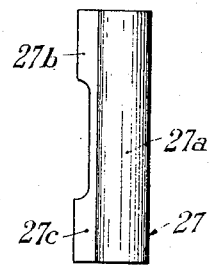
Figure 6A:
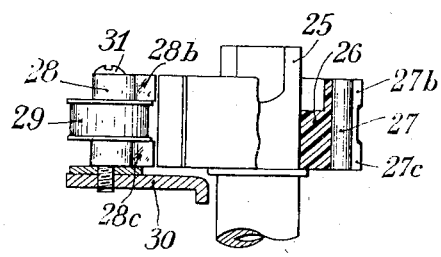
Figure 6a is a longitudinal section taken upon the line U—U of Fig. 6.
Figure 7A:
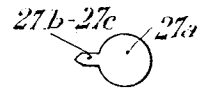
Figure 7a is a plane view of the member of Fig. 7.

In Figs. 6 and 6a the shaft 25 carries a disc 26 carrying on its outer periphery a plurality of soft-iron members 27 (eight in the example illustrated). These soft-iron members 27 comprise a cylindrical portion 27a having its axis parallel to the axis of rotation of the disc, this cylindrical portion having a radial extension at either end in the form of narrow pole pieces 27b and 27c.

The magnetic circuit 28 having wound thereon the different oscillating and booster coils illustrated in block form at 29 is secured on a plate 30 by a screw 31. The pole pieces 28b and 28c of this circuit 28 are tapered so as to form edges parallel to the axis of rotation of the disc 25, these edges registering with the narrow pole pieces 27b, 27c of the different soft-iron members 27. It will be seen that during the rotation of the disc 26 the closing of the magnetic circuit 28 by each member 27 takes place during a very short time due to the form of the magnetic gap which is practically linear.

In Figs. 8 and 8a the disc 26 carries a plurality of soft-iron members 32, each of these members comprising a cylindrical portion 32a having at either end a tapered or pointed portion 32b, 32c.

The magnetic circuit 33 comprises tapered pole pieces 34b, 34c having a common axis parallel to the axis of rotation of the disc 26. The gap between the vertices of the tapered ends 34b and 34c is slightly greater than the distance between the vertices of the tapered ends 32b and 32c. During the rotation of the disc 26 each soft-iron member 32 passes through the position in which it is shown, wherein its axis is coincident with the common axis of the pole pieces 34b and 34c. In this case the coupling time of the coils 29 is also reduced to a minimum as the gap is practically of pin-point characteristic.

The rotary breaker means described hereinabove are also suitable for use as pulse generators provided that the soft-iron members are replaced by small magnets of similar design.

Figure 10:
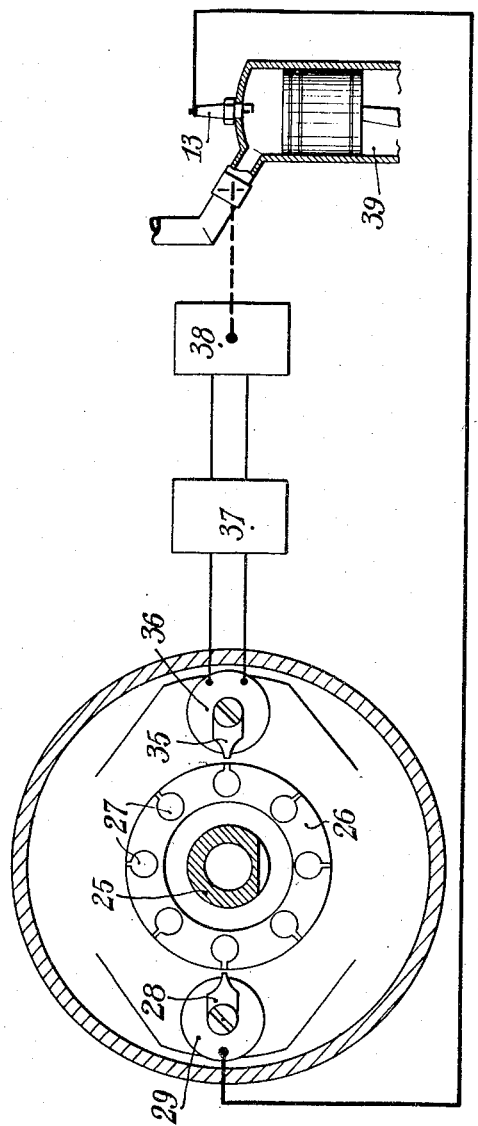
Figures 10 and 10a are diagrams illustrating the application of the device according to the present invention to the control of a direct-injection fuel feed system.

In Fig. 10, the device of this invention is also adapted to control another system, for example the direct-injection fuel feed system of an internal combustion engine. To this end, the device of Fig. 6, for example, may comprise in addition another magnetic circuit 35 having the same general arrangement as the magnetic circuit 28 and having wound thereon a coil 36. This coil 36 is connected to a dephasing system 37 which also comprises a source for energizing the coil 36 and a resistance in series therewith so as to collect a pulse at each variation in the magnetic resistance of the magnetic circuit 35. This dephasing system 37 is connected in turn to a device 38 for controlling the direct injection of fuel into a cylinder 39. The sparking plug 13 of this cylinder is connected to the booster coil of the assembly 29.

Thus, the pulses generated in the coil 36 during the rotation of the disc 26 are adapted to control the device 38 and to produce the direct injection of fuel into the engine cylinder 39.

The purpose of the dephasing device 37 is to introduce a phase shift subordinate to the velocity of rotation of the engine between the H—T pulse fed to the sparking plug 13 and the control pulse collected by the coil 36 and transmitted to the control device 38 of the injection system.

Figure 11:
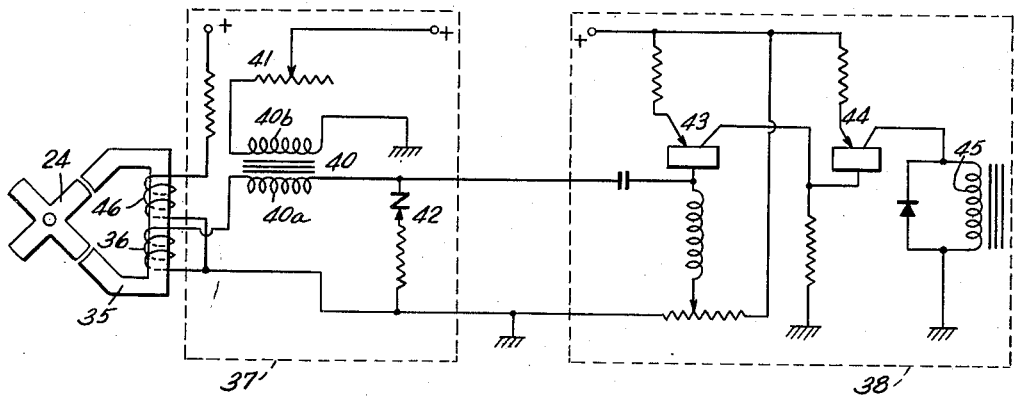
Figure 11 is a wiring diagram of a dephasing system and of a device for controlling the direct injection of fuel.
Figure 12:
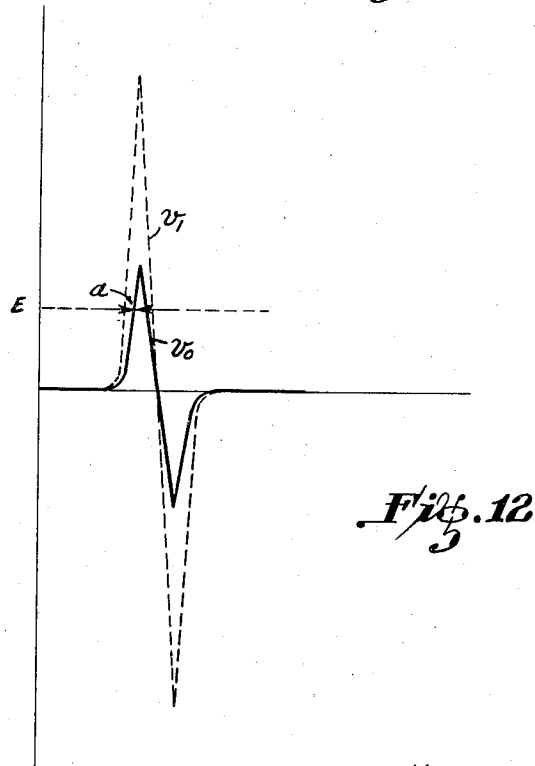
Figure 12 is a diagram illustrating the operation of the dephasing system.

In Fig. 11 of the drawings the dephasing circuit 37 comprises a saturated core transformer 40 of which the working winding 40a is connected in series with the coil 36 wound on the magnetic circuit 35. The control winding 40b is connected in series with a potentiometer 41. The pulses generated in the coil 36 due to the periodic variations of the flux generated by the coil 46 have an amplitude increasing with the velocity of rotation of the core 24. The shape of these pulses is shown diagrammatically in Fig. 12, that is, in thick lines for a relatively moderate rotational speed $V_0$, and dotted lines for a relatively high rotational speed $V_1$.

Connected to the output of winding 40a is a "Zener"-mounted diode 42. This diode becomes conductive for a reverse voltage E so that the pulses are chopped at this value E. It is clear from Fig. 12 that the chopped pulse produced at a speed $V_1$ receives a forward shift by a value A relative to the chopped pulse corresponding to the speed $V_0$.

The function of the saturable-core transformer is to alter the shape of the pulses, notably their width, and consequently the value of the phase-shift a. Thus, the slider of potentiometer 41 may be displaced by adequate means for shifting as a function of various parameters the beginning of the fuel injection.

The chopped pulses are fed to the input of the direct-injection control device 38. This device may include a monostable multivibrator consisting of transistors 43 and 44. The pulses received by the collector electrode of transistor 44 energize the coil 45 of an electromagnet valve controlling the fuel injection.

Figure 10A:
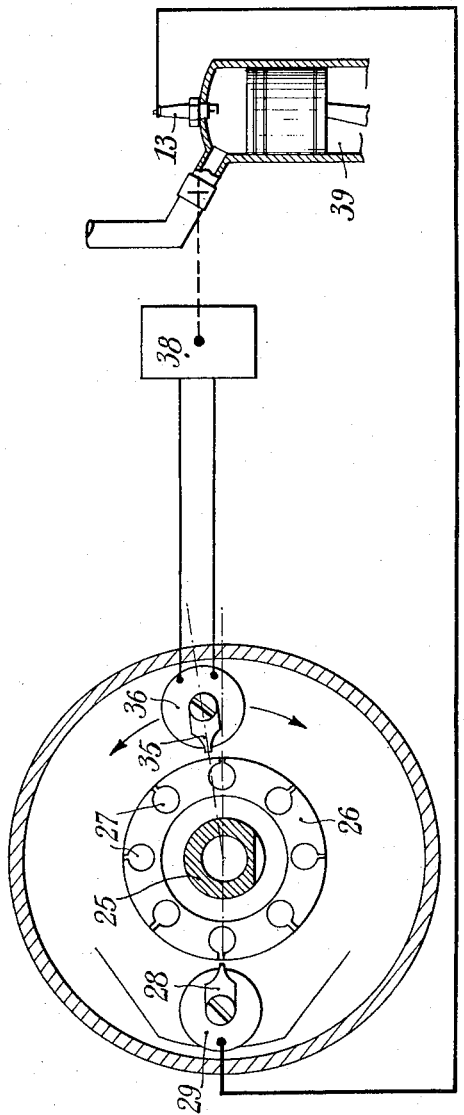

According to a modified embodiment illustrated in Fig. 10a the magnetic circuit 35 is detachably mounted and in this case the dephasing system 37 may be dispensed with. Thus, the phase shift is obtained by producing a mechanical shifting between the magnetic circuit 35 and the coil 36. This phase shift is controlled as a function of the engine speed by a conventional-type adequate mechanical system (not shown).

It will be seen that with this arrangement an accurate timing will be obtained in a reliable manner between the injection system and the ignition system. Thus in the specific case of a direct injection system, this arrangement will provide a fuel combustion under the optimum conditions, a feature which it had not been possible to obtain with previously known arrangements.

With the devices according to this invention which are described hereinabove with reference to the accompanying drawings, the shape of the high tension pulses produced is obviously dependent on the frequency of the current breaks. At low engine speeds, their sides are moderately inclined and become steeper at high r.p.m. values. In order to ascertain with precision the tension threshold at which the spark will occur at the plugs, it is possible to incorporate in the high tension circuit a peak-clipping element allowing only that portion of the pulse of which the voltage is higher than the threshold level to pass therethrough.

Of course, it would not constitute a departure from the present invention if the novel ignition principle utilized therein were applied to an engine having any other number of cylinders and operating according to a different cycle of operation. The only change required would be a modification in the rotary breaking elements and their driving devices.

What I claim is:

1. Ignition system of internal combustion engine which comprises a transistor mounting, a first coupling means for coupling an output circuit with an input circuit of said transistor, said first coupling means comprising at least one first inductive element so that said mounting may produce high-frequency oscillations, second coupling means for delivering said oscillations to a plurality of sparking plugs, said second coupling means comprising at least one second inductive element inductively coupled through a first magnetic circuit with said first inductive element, and mechanically driven rotary core for varying the coupling between said elements, said rotary core being actuated in synchronism with the engine motion, to control the delivery of the oscillations to the different sparking plugs and comprising a plurality of arms, said first magnetic circuit being alternately closed and opened by said arms during the rotation of said core.

2. An ignition device for internal combustion engine according to claim 1, wherein the mechanically driven rotary core for varying the coupling between the first and second inductive means consists of a rotary disc comprising a plurality of soft-iron members disposed at its outer periphery.

3. An ignition device for internal combustion engine according to claim 2, wherein the first magnetic circuit comprises pole pieces consisting of tapered edges parallel to the axis of rotation of the disc, and wherein the soft-iron members are cylindrical and formed with radial extensions registering with said pole piece through the medium of tapered edges.

4. An ignition device for internal combustion engine according to claim 2, wherein the first magnetic circuit comprises tapered pole pieces having a common axis parallel to the axis of rotation of the disc, said tapered pole pieces being turned towards each other, and wherein said soft-iron members comprise a cylindrical surface and two tapered surfaces connected to the ends of said cylindrical surface respectively, the axes of the different soft-iron pieces being successively brought in coincidence with the axis of the pole pieces of the first magnetic circuit during the rotation of the disc.

5. An ignition device for internal combustion engine according to claim 1 which comprises in addition a second magnetic circuit, another inductive member wound on said second magnetic circuit, means for generating pulses in said other inductive member, said means being actuated synchronously with the mechanically-driven means for varying the coupling between the first and second inductive members, means for dephasing these pulses as a function of the engine speed and other means controlling the direct injection of fuel in said engine, said last-mentioned means being actuated by the pulses produced in said other inductive member.

6. An ignition device for internal combustion engine according to claim 5, wherein said pulses produced in said other inductive member occur at the same time as the oscillations in the second inductive elements and the phase-shifting means consists of a dephasing circuit connected to another inductive element.

7. An ignition device for internal combustion engine according to claim 5, wherein said second magnetic circuit is angularly shifted relative to said means, and wherein means are also provided for varying this angular shifting as a function of the engine speed.

References Cited in the file of this patent

UNITED STATES PATENTS

| | | |
|---|---|---|
| 1,134,537 | Hutches | Apr. 6, 1915 |
| 2,401,175 | Morrill | May 28, 1946 |
| 2,795,214 | Shook | June 11, 1957 |